April 23, 1968 D. S. WILLY 3,379,277
FLEXIBLE EXHAUST GAS CONDUIT AND MUFFLER
Filed Jan. 17, 1966
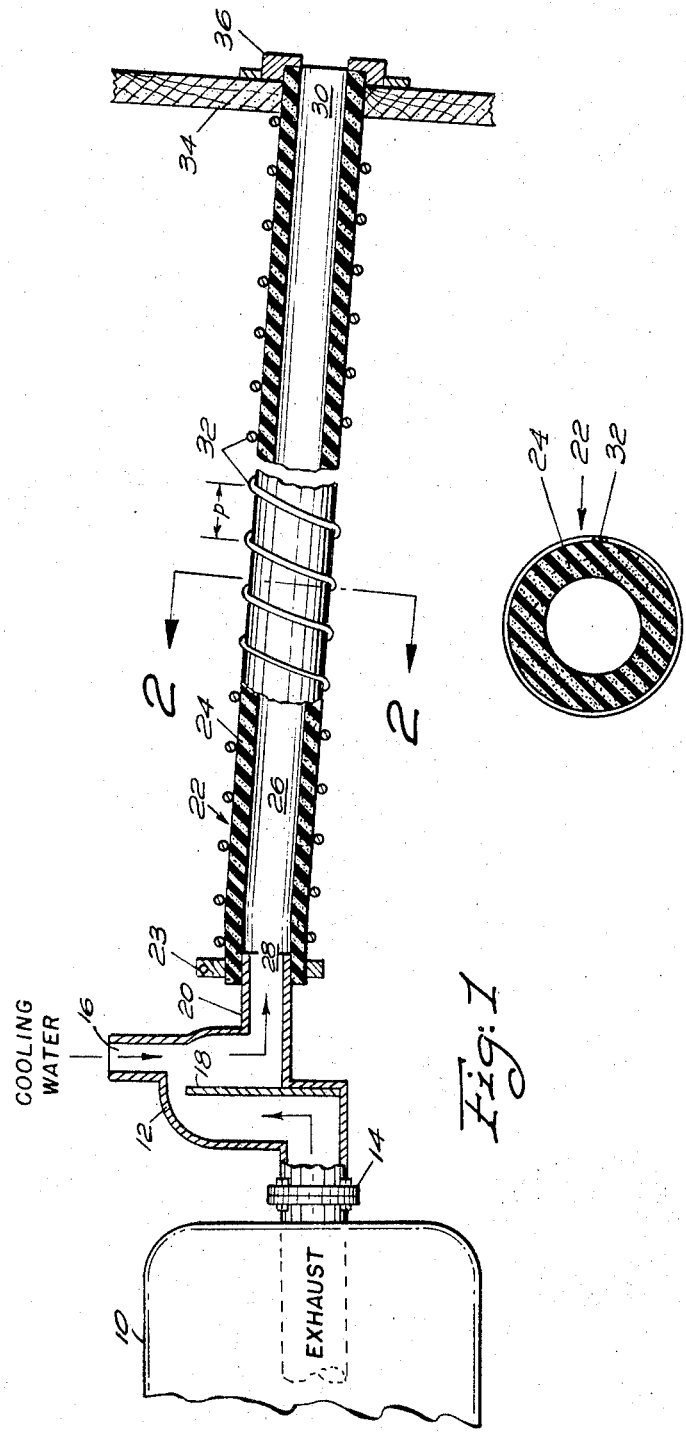
INVENTOR.
DONALD S. WILLY
BY
Kenway, Jenney & Hildreth

United States Patent Office 3,379,277
Patented Apr. 23, 1968

3,379,277
FLEXIBLE EXHAUST GAS CONDUIT AND MUFFLER
Donald Sargent Willy, Squantum, Mass., assignor to Submarine Research Laboratories, Everett, Mass., a corporation of Massachusetts
Filed Jan. 17, 1966, Ser. No. 521,060
6 Claims. (Cl. 181—36)

My invention relates to an exhaust muffler. In particular, it relates to an exhaust muffler for wet exhaust systems of internal combustion engines, and is therefore particularly adapted for use with marine engines.

The exhaust gases of internal combustion engines are discharged from the engine under conditions of high temperature and pressure, the gas appearing in the form of pulsating waves or pressure pulses resulting from the release of the explosive charges within the engine. These pulses must be muffled in some way to eliminate the short-sharp sounds which would otherwise result upon discharge of the exhaust into the atmosphere. Present devices to dissipate the objectionable sound energy of the exhaust gases generally comprise mechanical mufflers in the form of an expansion chamber having a series of baffles with holes therein to allow the gas to expand more gradually before being discharged to the atmosphere. Mufflers of this type, in addition to being bulky and expensive, may create an undesirable back pressure which reduces the efficiency of the engine.

In the case of marine engines, where an ample supply of water is available, exhaust installations for the sake of simplicity and economy frequently consist merely of a straight run of piping from the engine to the through hull discharge fitting, with cooling water introduced into the piping immediately following the engine. While the result of mingling water with exhaust gases is to reduce to a considerable extent the sound levels, the exhaust noise still remains objectionably high in most instances.

I have found that a simple and efficient muffler for wet exhaust systems may be provided by directing the exhaust gases through a conduit, the walls of which are effective along their entire length to adsorb the sound pulses within the exhaust gas. In particular, such a muffler may be formed from an elongated, thick-walled conduit of resilient cellular material having a centrally disposed passage therethrough with resilient restraining and protective means snugly surrounding the outer walls of the conduit. The exhaust gas is introduced into the passage at one end of the conduit, together with a cooling fluid to protect the material against the deleterious effects of heat, and is allowed to flow along the length of the passage to the outlet end, the walls of the conduit progressively absorbing the sound contained in the exhaust gases and providing an integrating action to the pressure pulses within the gases, whereby the gases are discharged substantially continuously and silently. The muffler of my invention may be used in place of the conventional mufflers and of the rigid piping systems described above, or may be used in conjunction with either or both to provide almost complete silencing of the exhaust discharge.

As has already been indicated, wet exhaust systems are commonly employed on engines for marine use, where a continuous supply of water is available for mixing with the hot gases during the discharge through an exhaust pipe leading from the engine to the stern of the boat in the case of propulsion-type engines, and to the side of the boat in the case of electrical generator-type engines. Cooling water introduced into the exhaust pipe serves to reduce the temperature of the pipe and thereby prevent dangerous overheating, as generally the exhaust pipe must run through a confined space. The cooling water also provides appreciable reduction in the exhaust noise, by absorbing energy, in addition to its substantial cooling effect and consequent reduction in gas volume; in general, however, the cooling water fails to reduce the sound energy in the exhaust gases to an acceptable level and further noise reduction is required. Since present exhaust pipes are generally of a metallic or relatively stiff rubber composition, they fail to contribute to noise reduction. The muffler of my invention may replace this exhaust line completely and can thus serve both as a highly-effective muffler and as a conduit for the exhaust gases from the engine to the exterior of the vessel. Due to the flexibility of the muffler described herein, it can be used with internal combustion engines of any type, including propulsion-type engines, whether situated relatively far from the final discharge port as in conventional inboard engines or near to this port as in inboard-outboard engines, and auxiliary electrical power generators which are generally located quite near to the final discharge port.

Accordingly, it is an object of my invention to provide a combined muffler and exhaust conduit for wet exhaust systems that will provide a very high degree of silencing without impairing engine efficiency. Further, it is an object of my invention to provide an improved muffler for wet exhaust systems which may readily be installed on conventional internal combustion engines, and which will decrease the sound level of the exhaust gases and reduce the exhaust back-pressure to a greater extent than conventional exhaust systems. A further object of my invention is to provide an improved muffler for wet exhaust systems which may be employed with equal effectiveness whether the engine and the point of discharge through the hull are widely separated or relatively close together.

Other and further objects and features of my invention will appear below in the following detailed description of a preferred embodiment thereof which has been selected for purposes of illustration and which is shown in the accompanying drawings in which:

FIGURE 1 is a side view, partially in section of the combined muffler and exhaust conduit of my invention as installed on a boat having a wet exhaust system; and FIGURE 2 is a cross-sectional view of the special thick-walled exhaust conduit of my invention, taken along the lines 2—2 of FIGURE 1.

In accordance with my invention, I provide an exhaust muffler for wet exhaust systems comprising an elongated, sound absorbent conduit having relatively thick walls of resilient material surrounding a central passage through which the exhaust gases, intermingled with the cooling water, are discharged. The walls are preferably formed from a foam neoprene material of the closed-cell type and have resilient restraining means in snug engagement with the outer wall portion of the conduit. The restraining means, more fully described hereafter, provides mechanical protection to the tubing against crushing and kinking and also, by its close mechanical coupling to the outer wall of the conduit, reduces mechanical vibration and enhances the effectiveness of the thick-walled resilient conduit in absorbing the exhaust pulses.

FIGURE 1 shows a side view of my invention, partially in section, as installed on a marine propulsion engine having a conventional wet-exhaust system, while FIGURE 2 is a cross-sectional view of the muffler taken along the lines 2—2 of FIGURE 1. Attached to an engine 10 is a conventional bell-type water injection system 12 having an exhaust inlet port 14 and a water inlet port 16. A baffle 18 prevents cooling water injected through the port 16 from entering the engine 10. The exhaust gas and cooling water feed through the outlet port 20 into a conduit 22 which is tightly fitted around the exhaust port 20 and clamped to the port by means of a hose clamp 23. The tubing 22 has relatively thick walls 24 and a central hollow passage 26 through which the intermingled exhaust gases and cooling water may pass from the inlet end 28 to the outlet end 30. The walls 24 are formed from a resilient, sound absorbent material; preferably; the material is an open-celled resilient plastic material such as foam neoprene which provides mechanical strength while at the same time providing a material in which sound energy may readily be dissipated due to the large number of cells in the material. Secured to the conduit 22 in closely fitting mechanical engagement with it is a helically wound wire or spring 32 which extends substantially the entire length of the conduit. The restraining wire 32 is formed from metallic wire having a thickness of from 1/16 inch to 3/16 inch and a pitch or spacing of from 1/2 inch to 2 1/2 inches; preferably, the wire 32 is formed from 1/8 inch diameter steel wire and has a pitch of approximately 1 1/4 inches.

The outlet end 30 of the conduit 22 is passed through a transom 34 and through a flange 36 which is attached to the transom to allow the exhaust gases to discharge into the atmosphere at the stern of the boat. The last several inches of the conduit 22 are coated with a viscous sealing composition such as neoprene rubber to seal the end of the wire 32 to the conduit and to prevent tearing the outlet end of the conduit; this coating also provides a waterproof seal between the conduit and the transom. If desired, the conduit 22 may be connected to a through-hull fitting instead of being run directly through the transom as shown. It will be seen from the drawings that the conduit slopes downwardly to the transom 34 to allow discharge of the cooling water.

In operation, exhaust gases and cooling water are mixed in the water-injection system 12 and are fed to the central passageway 26 of the conduit 22. Due to the sequential operation of the cylinders in the engine 10, the exhaust gases will be supplied to the conduit in the form of a series of pressure pulses. If these pulses were fed directly to the atmosphere after generation by the engine 10, the rapid expansion of the compressed gas in these pulses would create a series of popping noises which are characteristic of internal combustion engines which do not utilize some sort of muffling system. By feeding the exhaust gases to the resilient muffler of my invention, a gradual expansion of the gases takes place throughout the entire length of the muffler, the pressure pulses being progressively damped, and the sound energy contained in said pulses being progressively absorbed and dissipated by the walls of the tubing, as the exhaust gases travel from the inlet portion of the conduit to the outlet portion. The spring 32, in addition to providing mechanical protection for the conduit, restrains the walls of the conduit from excessive expansion and assists in the dissipation of sound energy. In effect, the spring and conduit comprising the muffler act as a distributed filter system, the walls of the conduit corresponding to shunt capacitances in the filter and the spring restraining the conduit corresponding to series inductances. Although I have shown the wire 32 as being secured on the outside of the conduit, it will be apparent that this wire may be molded within the walls of the conduit and just below the outer surface.

At certain frequencies, which will be determined mainly by the thickness and pitch of the wire 32 and also in part by the thickness of the walls 24 of the conduit 22, a resonance condition may be created in which the wire and conduit will vibrate rapidly with small-amplitude motion. This motion will be transmitted to the hull of the boat in which the system is installed and, if left unattended, may shake the spring and conduit free from its fittings on the transom, thereby causing the cooling water to discharge within the hull of the boat. It is desirable, therefore, that such vibrations be minimized for the speed range over which the engine 10 is normally operated. This is readily accomplished by adjusting the pitch of the wire 32 before it is firmly seated around the tubing 22. For engines operating at a speed of approximately 900 revolutions per minute, or a multiple thereof (1800, 2700 r.p.m.), which is characteristic of auxiliary power generators used in small marine vessels, it has been found that a pitch of approximately 1 1/4 inches for a steel wire having a diameter of 1/8 inch thickness will effectively minimize resonance effects under normal operating conditions.

The diameter of the conduit and particularly the passage size should, of course, be correlated with the size of the engine. For engines of up to 8 horsepower (or electrical generators having an output power of 3000 watts), the conduit 22 may have an inside diameter of 1 inch and an outside diameter of 2 inches. For engines of up to 35 horsepower capacity (or generators having a 15,000 watt power output) the conduit 22 may have a 1 1/2 inch inside diameter and a 2 1/2 inch outside diameter. Larger engines will, of course, require a conduit of larger inside diameter to handle the increased exhaust gases. The length of the conduit 22 should be of the order of 10 feet to reduce the noise level of the exhaust to an acceptable level for engines of up to 35 HP capacity, with proportionally longer lengths for engines of greater capacity. If the distance between the engine exhaust port and the point at which the cooling water is to be discharged is less than 10 feet, the conduit may be coiled to match the distance between the engine exhaust port and the cooling water discharge port, care being taken to ensure that the cooling water can feed easily through the conduit under the influence of gravity.

Although the muffler of my invention has been described with particular reference to installation on propulsion plants aboard marine vessels, it will be apparent that its use is not so restricted. In general, the muffler of my invention may be used to decrease the sound level of the exhaust of any type of internal combustion engine provided that a means of cooling the inside walls of the tubing are available to protect the tubing from the adverse effects of heat.

From the above it may be seen that I have provided an improved muffler for wet exhaust systems, the muffler being of light weight and simple and inexpensive to manufacture. Further, I have provided an improved muffler for wet exhaust systems which obviates the use of a separate exhaust line, since the resilient conduit may provide the entire exhaust conduit from engine outlet to the through-hull fitting, thus further reducing the cost of muffling and exhaust systems and greatly simplifying the installation.

It will thus be seen that the objects set forth above, among those made apparent from the preceding description, are efficiently attained and, since certain changes may be made in the above constructions without departing from the scope of the invention, it is intended that all matter contained in the above description and shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

Having described my invention, I claim:

1. A combination muffler and exhaust gas conduit for internal combustion engines in which cooling water is introduced into the exhaust gases close to the engine, comprising an elongated thick-walled conduit of resilient cellular material having a central passage for the mixture of exhaust gas and cooling water, and resilient restraining means in snug mechanical engagement with the outer wall portion of the conduit.

2. The combination defined in claim 1 in which said conduit is formed from a plastic material.

3. The combination defined in claim 2 in which said material is foam neoprene.

4. The combination defined in claim 2 in which said restraining means has an inside diameter slightly smaller than the outside diameter of said tubing, said restraining means being helically wrapped around said tubing with a pitch substantially greater than the thickness of said restraining means.

5. The combination defined in claim 4 in which said restraining means is formed from metallic wire having a thickness of from $\frac{1}{16}$ inch to $\frac{3}{16}$ inch, said pitch being in the range of $\frac{1}{2}$ inch to $2\frac{1}{2}$ inches.

6. The combination defined in claim 5 in which said restraining means has a thickness of approximately $\frac{1}{8}$ inch and a pitch of approximately $1\frac{1}{4}$ inches.

References Cited

UNITED STATES PATENTS

| | | | |
|---|---|---|---|
| 854,778 | 5/1907 | Thomson | 181—61 |
| 1,447,749 | 3/1923 | Beselin | 181—36 |
| 3,160,549 | 12/1964 | Caldwell et al. | 181—33 |
| 3,208,552 | 9/1965 | Seifert | 181—52 |
| 3,273,596 | 9/1966 | Beckett | 181—47 |

FOREIGN PATENTS

| | | |
|---|---|---|
| 968,347 | 9/1964 | Great Britain. |
| 982,068 | 2/1965 | Great Britain. |

ROBERT S. WARD, Jr., *Primary Examiner.*